US011806693B2

(12) United States Patent
Betz et al.

(10) Patent No.: US 11,806,693 B2
(45) Date of Patent: Nov. 7, 2023

(54) HPLC CARBON WITH NARROW PARTICLE SIZE DISTRIBUTION

(71) Applicant: Sigma-Aldrich Co. LLC, St. Louis, MO (US)

(72) Inventors: William R. Betz, State College, PA (US); Michael J. Keeler, Bellefonte, PA (US); Curtis W. Frantz, State College, PA (US); Jay M. Jones, Bellefonte, PA (US); William Maule, Altoona, PA (US); Kenneth G. Espenschied, Spring Mills, PA (US); Cory E. Muraco, State College, PA (US); Clinton Corman, State College, PA (US); Maochun Ye, Bellefonte, PA (US)

(73) Assignee: Sigma-Aldrich Co. LLC, St. Louis, MO (US)

( * ) Notice: Subject to any disclaimer, the term of this patent is extended or adjusted under 35 U.S.C. 154(b) by 274 days.

(21) Appl. No.: 17/349,562

(22) Filed: Jun. 16, 2021

(65) Prior Publication Data

US 2021/0394156 A1    Dec. 23, 2021

Related U.S. Application Data

(60) Provisional application No. 63/039,857, filed on Jun. 16, 2020.

(51) Int. Cl.
| | | |
|---|---|---|
| *B01J 20/282* | (2006.01) | |
| *B01J 20/20* | (2006.01) | |
| *B01J 20/28* | (2006.01) | |
| *B01J 20/30* | (2006.01) | |
| *C01B 32/205* | (2017.01) | |

(52) U.S. Cl.
CPC ............. *B01J 20/282* (2013.01); *B01J 20/20* (2013.01); *B01J 20/28004* (2013.01); *B01J 20/2808* (2013.01); *B01J 20/28021* (2013.01); *B01J 20/28052* (2013.01); *B01J 20/28071* (2013.01); *B01J 20/28073* (2013.01); *B01J 20/28083* (2013.01); *B01J 20/3057* (2013.01); *B01J 20/3071* (2013.01); *B01J 20/3078* (2013.01); *B01J 20/3085* (2013.01); *C01B 32/205* (2017.08); *B01J 2220/54* (2013.01); *C01P 2004/03* (2013.01); *C01P 2004/34* (2013.01); *C01P 2004/61* (2013.01); *C01P 2006/14* (2013.01); *C01P 2006/16* (2013.01)

(58) Field of Classification Search
CPC .... B01J 20/20; B01J 20/282; B01J 20/28004; B01J 20/3057; B01J 20/3078; B01J 20/28021; B01J 20/28052; B01J 20/28071; B01J 20/28073
See application file for complete search history.

(56) References Cited

U.S. PATENT DOCUMENTS 4,263,268 A * 4/1981 Knox ....................... B01J 21/18
                                                     423/454
9,520,594 B2    12/2016 Neumann et al.

FOREIGN PATENT DOCUMENTS

WO    2009/010945 A2    1/2009

OTHER PUBLICATIONS

Bapiro et al., "Understanding the Complexity of Porous Graphitic Carbon (PGC) Chromatography: Modulation of Mobile-Stationary Phase Interactions Overcomes Loss of Retention and Reduces Variability", Analytical Chemistry, vol. 88, 2016, pp. 6190-6194.
Estevez et al., "Hierarchically Porous Graphitic Carbon with Simultaneously High Surface Area and Colossal Pore Volume Engineered via Ice Templating", ACS Nano, vol. 11, Oct. 18, 2017, pp. 11047-11055.
Xia et al., "Templated Nanoscale Porous Carbons", Nanoscale, vol. 2, Feb. 26, 2010, pp. 639-659.

* cited by examiner

*Primary Examiner* — Yong L Chu
(74) *Attorney, Agent, or Firm* — Sigma-Aldrich Co. LLC

(57) ABSTRACT

Methods for producing porous graphic carbon microspheres having improved separation properties over conventional porous graphitic carbons. The methods include dispersing a monovinyl aromatic monomer, a polyvinyl aromatic monomer, and an initiator in a solvent, contacting porous silica microspheres with the monomer dispersion for a time sufficient for the monomers to coat the porous silica microspheres, polymerizing the monomers to form copolymer coated microspheres, sulfonating the copolymer, pyrolyzing the sulfonated copolymer, digesting the carbon microspheres to dissolve the silica leaving porous carbon microspheres, pyrolyzing the porous carbon microspheres, and graphitizing the porous carbon microspheres to form porous graphitic carbon microspheres. Further provided are improved porous graphitic carbon microspheres and chromatography columns including the improved porous graphitic carbon microspheres described herein.

20 Claims, 18 Drawing Sheets

Specification includes a Sequence Listing.

(A)

(B)

(C)

(A)

(B)

(C)

(D)

(E)

(F)

(A)

(B)

(A)

(B)

(A)

(B)

(A)

(B)

(A)

(B)

(A)

(B)

SEQUENCE LISTING

```
<160> NUMBER OF SEQ ID NOS: 6

<210> SEQ ID NO 1
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (6)..(6)
<223> OTHER INFORMATION: phosphoserine

<400> SEQUENCE: 1

Val Leu His Ser Gly Ser Arg
1               5

<210> SEQ ID NO 2
<211> LENGTH: 10
<212> TYPE: PRT
<213> ORGANISM: Artificial Sequence
```

```
<220> FEATURE:
<223> OTHER INFORMATION: Description of Artificial Sequence: Synthetic
      peptide
<220> FEATURE:
<221> NAME/KEY: MOD_RES
<222> LOCATION: (6)..(6)
<223> OTHER INFORMATION: phosphothreonine

<400> SEQUENCE: 2

Arg Asp Ser Leu Gly Thr Tyr Ser Ser Arg
1               5                   10

<210> SEQ ID NO 3
<211> LENGTH: 11
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (1)..(1)
<223> OTHER INFORMATION: phosphothreonine
<220> FEATURE:
<221> NAME/KEY: MOD_RES
<222> LOCATION: (5)..(5)
<223> OTHER INFORMATION: phosphothreonine

<400> SEQUENCE: 3

Thr Lys Leu Ile Thr Gln Leu Arg Asp Ala Lys
1               5                   10

<210> SEQ ID NO 4
<211> LENGTH: 15
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (5)..(5)
<223> OTHER INFORMATION: phosphoserine

<400> SEQUENCE: 4

Ala Asp Glu Pro Ser Ser Glu Glu Ser Asp Leu Glu Ile Asp Lys
1               5                   10                  15

<210> SEQ ID NO 5
<211> LENGTH: 15
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (6)..(6)
<223> OTHER INFORMATION: phosphoserine
<220> FEATURE:
<221> NAME/KEY: MOD_RES
<222> LOCATION: (9)..(9)
<223> OTHER INFORMATION: phosphoserine

<400> SEQUENCE: 5

Ala Asp Glu Pro Ser Ser Glu Glu Ser Asp Leu Glu Ile Asp Lys
1               5                   10                  15

<210> SEQ ID NO 6
<211> LENGTH: 20
<212> TYPE: PRT
```

```
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (12)..(12)
<223> OTHER INFORMATION: phosphoserine

<400> SEQUENCE: 6

Phe Glu Asp Glu Gly Ala Gly Phe Glu Glu Ser Ser Glu Thr Gly Asp
1               5                   10                  15

Tyr Glu Glu Lys
            20
```

HPLC CARBON WITH NARROW PARTICLE SIZE DISTRIBUTION

CROSS-REFERENCE TO RELATED APPLICATIONS

This application claims the benefit of priority of U.S. Provisional Patent Application No. 63/039,857 filed Jun. 16, 2020, the entirety of which is incorporated herein by reference.

SEQUENCE LISTING

The instant application contains a Sequence Listing which has been submitted electronically in ASCII format and is hereby incorporated by reference in its entirety. Said ASCII copy, created on Jul. 19, 2021, is named P20-095 US-NP SL.txt and is 2,349 bytes in size.

BACKGROUND

Porous graphic carbon (PGC) is a robust chromatographic stationary phase, finding particular use in the separation of polar compounds U.S. Pat. No. 4,263,268 provides a hard template method for preparing porous graphitic carbon. The method disclosed therein involves coating a porous template material, such as silica, glass or alumina with a polymerizable material, specifically phenol and hexamine, or resole; polymerizing and cross-linking; pyrolyzing; removing the template; then further treating, e.g., repeating polymerization-pyrolyzing steps or graphitization, to increase structural strength. Porous graphitic carbons made by the disclosed process have been used in commercial chromatography columns.

Commercially available PGC columns, however, have well-documented drawbacks, including, variability and loss of retention, both within a run and over a period of time. (see, e.g., Bapiro, et al. Anal. Chem. 2016, 88, 6190-6194.) The loss of retention in commercially available PGC columns is thought to be due to these columns' susceptibility to contamination.

Until now, efforts to overcome these limitations have focused on backflushing and development of wash procedures, that may involve strong acids and/or bases and solvents, such as tetrahydrofuran, acetone, and trifluoroacetate. These attempts to mitigate contamination and loss of retention, however, require additional time for analysis, sometimes substantial, as well as hazardous waste. Furthermore, the results of such steps often do not completely overcome the problems.

Another approach to overcome these problems has been to develop methods that results in less contamination of the columns, e.g., through careful selection of reagents and conditions. Again, such approaches can be time-consuming and not altogether satisfactory in the end.

A need exists for new PGC materials with greater stability and resistance to contamination.

SUMMARY

Provided herein are improved methods for making porous graphitic carbon microspheres by providing porous silica microspheres, dispersing a monovinyl aromatic monomer, a polyvinyl aromatic monomer, and an initiator in a solvent, contacting the porous silica microspheres with the monomer dispersion for a time sufficient for the monomers to coat the porous silica microspheres, removing the solvent, polymerizing the monomers to form copolymer coated microspheres, sulfonating the copolymer to form a sulfonated copolymer, pyrolyzing the sulfonated copolymer to form carbon microspheres, digesting the carbon microspheres to dissolve the silica leaving porous carbon microspheres, pyrolyzing the porous carbon microspheres, and graphitizing the porous carbon microspheres to form porous graphitic carbon microspheres.

In a second embodiment, a method for preparing porous graphitic carbon microspheres involves providing a porous microsphere hard template, contacting the hard template with a combination of comonomers comprising divinylbenzene and styrene so that the comonomers impregnate the pores of the hard template, polymerizing the comonomers form a divinylbenze-styrene copolymer, sulfonating the copolymer, pyrolyzing the sulfonated copolymer to form carbon microspheres, dissolving the hard template to form porous carbon microspheres, and graphitizing the porous carbon microspheres.

Further provided are porous graphitic carbon monospheres formed by the methods described herein, as well as columns for liquid chromatography including the porous graphitic carbon microspheres described herein.

DETAILED DESCRIPTION

Figure 1:
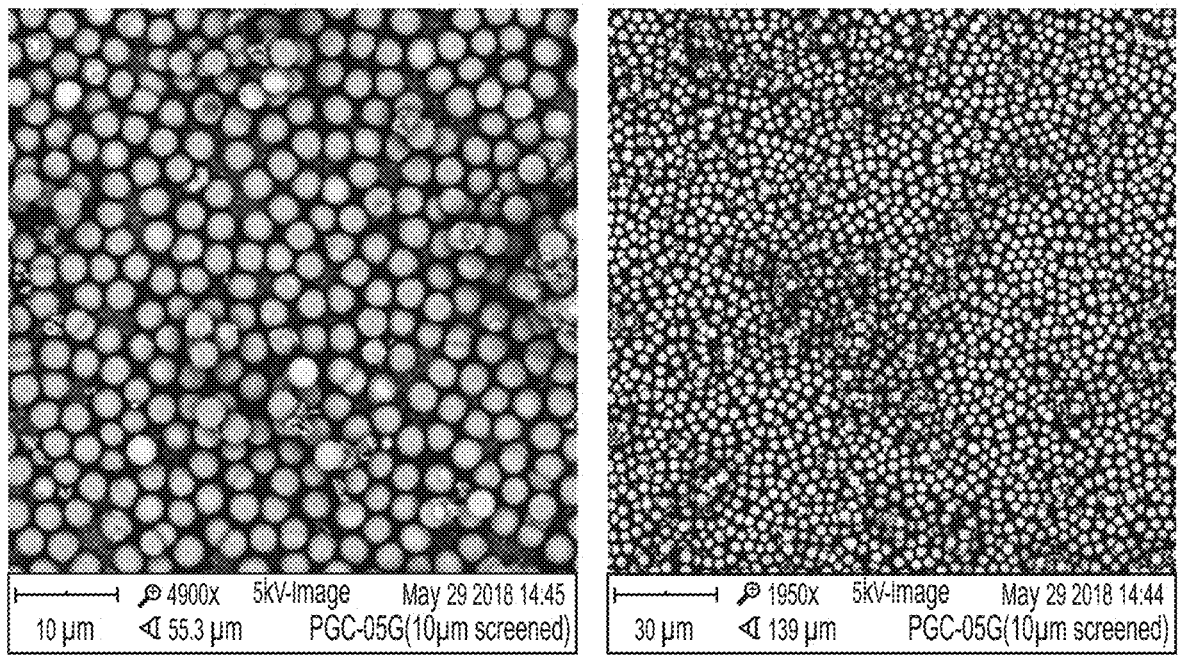
FIG. 1 shows two scanning electron microscope (SEM) images of the PGC material described. These images exhibit a very narrow particle size distribution and low amounts of fragmentation and agglomeration.

Provided are new method for producing porous graphic carbon microspheres having improved separation properties over conventional porous graphitic carbons. Further provided are improved porous graphitic carbon microspheres and chromatography columns including the improved porous graphitic carbon microspheres described herein.

Porous, graphitic carbon (PGC) shows a high potential for use as a robust chromatographic stationary phase which provides unique retention characteristics, particularly for polar analytes. This material is able to withstand a pH range of 0-14 and extreme temperature without physical damage. Some advantages to using PGC over silica include: temperature and pH stability; retention of very polar compounds (without need for HILIC conditions); unique retention mechanism; compatibility with any solvent; and unique shape selectivity.

The porous graphitic carbon microspheres are formed by a multistep process. A dispersion is formed by dispersing monomers, including a monovinyl aromatic monomer and a polyvinyl aromatic monomer, along with an initiator in a solvent. A porous hard template, such as porous silica microspheres, are contacted with the monomer dispersion for a time sufficient for the monomers to coat the porous silica microspheres, including within the pores. The solvent is removed, then the monomers are polymerized to form copolymer coated microspheres. The copolymer coated microspheres are sulfonated using a polysulfonation process or more preferably, an oleum imbibement process. The sulfonated copolymer is the pyrolyzed to form carbon microspheres. Next, the carbon microspheres are digested, e.g., in a strong base or strong acid, to dissolve the template, leaving porous carbon microspheres having a geometry, size, and pore structure similar to that of the template. The porous carbon microspheres are pyrolyzed a second time and then graphitized to form porous graphitic carbon microspheres.

The hard template, and thus the PGC microspheres, may have a diameter in the range from about 1 micron to about 100 microns, depending on the ultimate purpose of the resulting PGC microspheres. For chromatography, the microspheres preferably have a diameter in the range from about 1 micron to about 20 microns, and more preferably from about 1 micron to about 5 microns. In some embodiments, the particles have an average diameter in the range from about 1.0 microns to about 5.0 microns, including, e.g., about 1.9 microns, 2.5 microns, 3.0 microns, 3.9 microns, and so on. In other embodiments, larger particles may be produced, such as in the range from about 50 microns to about 200 microns. In still other embodiments, e.g., for catalysis, even larger particles, such as 200 microns to 5 mm may be produced in accordance with the methods provided herein.

The average pore volume may be in the range from about 0.3 $cm^3/g$ to about 1 $cm^3/g$. Preferable, the average pore volume is in the range from about 0.65 $cm^3/g$ to about 0.85 $cm^3/g$. More preferable, the average pore volume is about 0.75 $cm^3/g$ to about 0.76 $cm^3/g$. The pore diameter may be in the range from about 20 Å to about 250 Å, preferably about 30 Å to about 200 Å. In some embodiments, the average pore diameter is in the range from about 30 Å to about 50 Å, preferably about 40 Å. In other embodiments, the average pore diameter is in the range from about 175 Å to about 225 Å, for example, about 175 Å, about 180 Å, about 185 Å, about 190 Å, about 195 Å, about 200 Å, about 205 Å, about 210 Å, about 215 Å, about 220 Å, or about 225 Å. In another preferred embodiment, the pore diameter is about 200 Å.

In a preferred embodiment, the monovinyl aromatic monomer is styrene and the polyvinyl aromatic monomer is divinylbenzene. In various embodiments, the ratio of styrene:divinylbenzene is from about 10:90 to about 50:50 (wt. %). In some embodiments, the the ratio of styrene:divinylbenzene is about 15:85, in other embodiments about 20:80, in other embodiments about 25:75, in other embodiments, about 30:70, in other embodiments, about 35:65, in other embodiments, about 40:60, and in still other embodiments about 45:55 (all wt. %). In a particularly preferred embodiment, the ratio of styrene:divinylbenzene is about 30:70 (wt. %).

The methods described herein further include a sulfonating step, which may be a polysulfonation process or an oleum imbibement process. Preferably an oleum imbibement process is used. Such process is performed by adding a mixture of sulfuric acid and fuming sulfuric acid to the copolymer coated microspheres while stirring and then heating to about 65° C., e.g., 65° C.±5° C., for a time sufficient to sulfonate the copolymer.

After the sulfonating step, the microspheres are pyrolyzed at a temperature of about 500° C., e.g., 500°±50° C., 500°±25° C., 500°±10° C., or 500°±5° C. Following pyrolysis, the microspheres are digested in a strong base or strong acid to dissolve the template material. In a preferred embodiment, the digestion step is done in approximately 3 M KOH, e.g., in various embodiments, 2.5 M KOH to 3.5 M KOH, or 2.9 M KOH to 3.1 M KOH.

After digestion, a second pyrolysis step is carried out at a higher temperature, preferably about 1050° C. In some embodiments, the second pyrolysis step is carried out at 1050° C.±100° C.; in other embodiments, at 1050° C.±50° C., in still other embodiments, at 1050° C.±25° C., and in still other embodiments, 1050° C.±10° C. Finally, the pyrolyzed carbon microspheres are graphitized at about 2500° C., e.g., in some embodiments, 2500° C.±500° C., 2500° C.±250° C., 2500° C.±100° C., 2500° C.±50° C., or 2500° C.±25° C.

In some embodiments, the method for preparing porous graphitic carbon microspheres involves the steps of providing a porous microsphere hard template, contacting the hard template with a combination of comonomers comprising divinylbenzene and styrene so that the comonomers impregnate the pores of the hard template, polymerizing the comonomers form a divinylbenze-styrene copolymer, sulfonating the copolymer, pyrolyzing the sulfonated copolymer to form carbon microspheres, dissolving the hard template to form porous carbon microspheres, and graphitizing the porous carbon microspheres.

Method of Making

Figure 2:
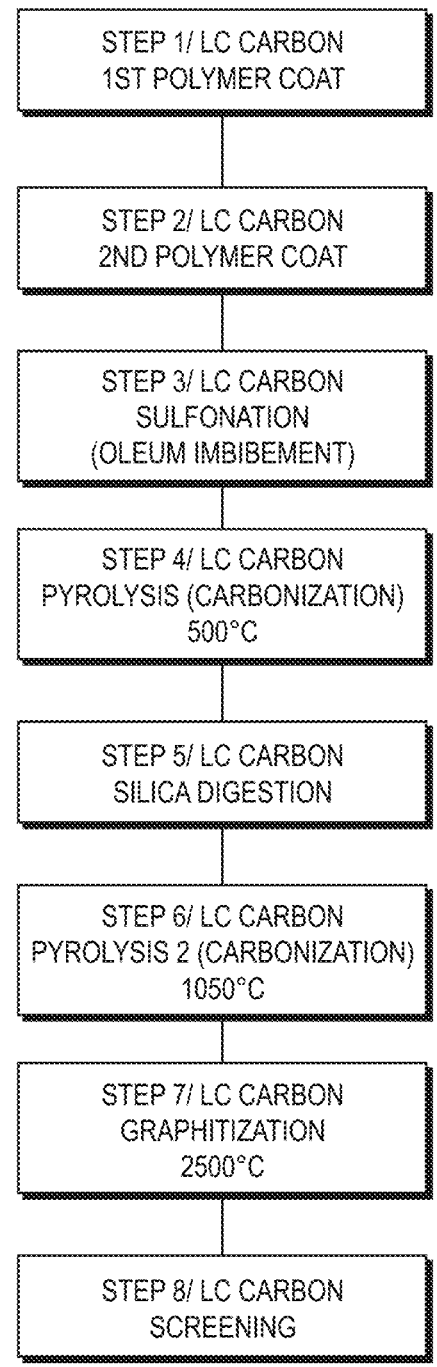
FIG. 2 is a flow chart outlining the steps of the improved method of preparing PGC described herein.

The general process outlined in the flow chart in FIG. 2 is used to prepare the PGC described herein. A porous hard template material, such as silica, glass, alumina, having a suitable particle size, pore structure, and dispersivity is chosen. The properties of the final PGC product, e.g., particle size, surface area, porosity, pore dimensions, and dispersivity depend on the properties of the template material. A fully porous, monodisperse silica has been found to make an advantageous template material. A particularly suitable template material is monodispersed silica microparticles, such as those prepared by the method described in WO2009010945. The silica template is dried at 140° C. under vacuum for approximately 24 hours.

Step 1. First polymer coat. The monomers, divinylbenzene and styrene, at a (70:30 ratio, by mass) and initiator, benzoyl peroxide, are weighed into a flask. A solvent, methylene chloride, is added to flask containing the monomers and initiator, and the resulting mixture is added to the dried silica in an evaporator flask, and then the flask is added to a rotary evaporation system. The flask is allowed to rotate at approximately 65° C. for a time sufficient for the contents to homogenize.

Once the contents are adequately homogenized, and the pores of the template are almost entirely filled with the divinylbenzene and styrene, the pore volume drops from ~0.70 cm³/g to ~0.10 cm³/g. Controlling the temperature and the use of the solvent help ensure even coating of the pore structure and even dispersement of the divinylbenzene and styrene monomers.

The solvent is then removed by heating to approximately 80° C. on the rotary evaporator. No vacuum is necessary for solvent removal and removal is typically complete within about 14-18 hours.

The resulting coated silica is washed twice with methanol and transferred to a glass pan, placed in an oven at 70 to 80° C. and held until polymerization is complete, approximately 16-24 hours.

Step 2. The polymer coating process is repeated a second time.

Step 3. Sulfonation—In step 3, a mixture of sulfuric acid and fuming sulfuric acid (oleum) is carefully added, dropwise, to the polymer coated silica material, while stirring. Following addition, the material is heated to 65° C. prior to complete the sulfonation.

While sulfonation may be accomplished using a polysulfonation process or the outlined oleum imbibement process, there are a few advantages of using the oleum imbibement process. It is safer—much less acid is required per batch of material than would be necessary for polysulfonation. No neutralization is necessary—the material does not need to be neutralized and filtered after acid treatment. This avoids transferring large quantities of acid and saves a day of process time. Better product—through feasibility and development, the oleum treated material led to a more reproducible carbon.

Step 4 is pyrolysis, or carbonization, of the material. The material is transferred to a horizontal combustion tube, and the tube inserted into the furnace. An $N_2$ flow is started and the following temperature ramp is used: (a) one-hour ramp to 200° C., (b) 30 minutes hold at 200° C., (c) one-hour ramp to 500° C., (d) one hour hold at 500° C., (e) furnace off.

Step 5. Digestion. In step 5, the silica template needs to be removed from the carbon particle. This is accomplished by stirring the carbon in ~3M potassium hydroxide solution overnight at 40° C. The silica is removed from the mixture via an acetic acid wash the following day. The voids left by the silica template are what create the pore structure in the final product. Following this step, the material is ready for the final high temperature furnace steps.

A round bottom flask is equipped with overhead stirrer, stir blade, condenser, temperature probe and heating mantle with temperature controlled. The water is turned on to the condenser and the flask is leaded with a combination of methanol (3000 mL) and DI water (2135 mL). 2240 g of 45% KOH solution is slowly added to the flask, with stirring. The temperature is set to 40° C. and the carbon material is slowly added to the flask. The flask is stoppered, and the digestion is allowed to proceed until complete.

Once complete, the resulting porous carbon microspheres are with a dilute acetic acid solution (approximately 300 g acetic acid in 1700 mL DI water). This acetic acid wash is repeated twice. Once complete, the particles are washed three times with DI water, and then three times with methanol, and then dried under vacuum.

Step 6. High temperature carbonization/second pyrolysis. The dried porous carbon microparticles are transferred into a quartz tray and the tray loaded into a Lindberg furnace. An $N_2$ flow is started and the following temperature ramp is used: (a) one-hour ramp to 200° C., (b) 30 minutes hold at 200° C., (c) one-hour ramp to 500° C., (d) 30 minutes hold at 500° C., (e) one-hour ramp to 1050° C., (f) one-hour hold at 1050° C., (g) furnace off.

Step 7. Graphitization. The pyrolyzed carbon material is loaded into a graphite crucible and loaded into a suitable oven. The material is graphitized at 2500° C.

The PGC prepared using a synthesis procedure described above allows for the control over physical characteristics such as particle size, particle size distribution, pore volume, and surface area. FIG. 1 shows two the scanning electron microscope (SEM) images of the PGC material described herein. These images exhibit a very narrow particle size distribution and low amounts of fragmentation and agglomeration.

Advantageously, when the silica microsphere starting material is monodisperse, such as monodisperse silica, the resulting porous graphitic carbon microspheres are nearly monodisperse. The table below shows the particle size distribution for the PGC described herein is compared with the particle size distribution of the monodispersed silica used as the hard template for the PGC.

| Mode | 05 | 19 | 30 | 39 | 41 | 44 | 47 | 50 | 58 | 62 | 68 |
|---|---|---|---|---|---|---|---|---|---|---|---|
| Silica | 2.81 | 2.72 | 2.76 | 2.89 | 2.81 | 3.03 | 2.72 | 2.94 | 1.94 | — | 2.68 |
| PGC | 2.81 | 2.60 | 2.76 | 2.76 | 2.76 | 3.19 | 2.85 | 2.94 | 2.89 | — | 2.56 |

Figure 3:
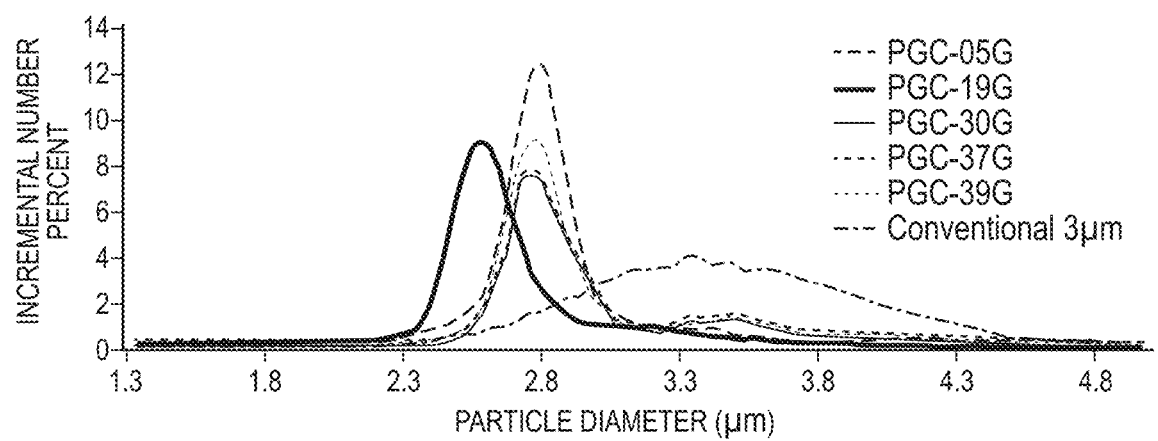
FIG. 3 shows the particle size distribution of 5 different PGC samples produced by the methods described herein, along with the particle size distribution of a commercially available PGC column.

FIG. 3 shows the particle size distribution of 5 different PGC samples produced by the methods described herein, along with the particle size distribution of a commercially available conventional PGC column.

The porous graphitic carbon microspheres formed are well-suited for liquid chromatography applications as described below. Specifically, the PGC microspheres described herein have improved properties over those in conventional PGC columns for liquid chromatography. Without being limited by theory, these improvements are believed to be due to a number of factors, or a combination of those factors. These factors include using a combination of monovinyl aromatic monomer and polyvinyl aromatic monomers, particularly, styrene and divinylbenzene; the effective dispersion of the monomers in solvent, which allows the monomers to more fully enter and coat the pores in the template; the polysulfonation step, particularly a oleum imbibement polysulfonation of the copolymer; and the choice of template material.

EXAMPLES

Example 1. Temperature Stability

The temperature stability of the PGC prepared using the method described above was tested. A 150×4.6 mm L×ID was packed with the PGC. A paraben sample containing (1) methylparaben, (2) ethylparaben, (3) propylparaben, (4) butylparaben was prepared and run under the following conditions: flow rate of 1 mL/min, 80:20 water:acetonitrile (v:v) mobile phase composition at three temperatures, 225° C., 250° C., 275° C. This experiment was run using a modified, high-temperature LC instrument. Each sample was run at each temperature in triplicate. A GC oven was used to heat the column to the desired temperature.

Figure 4:
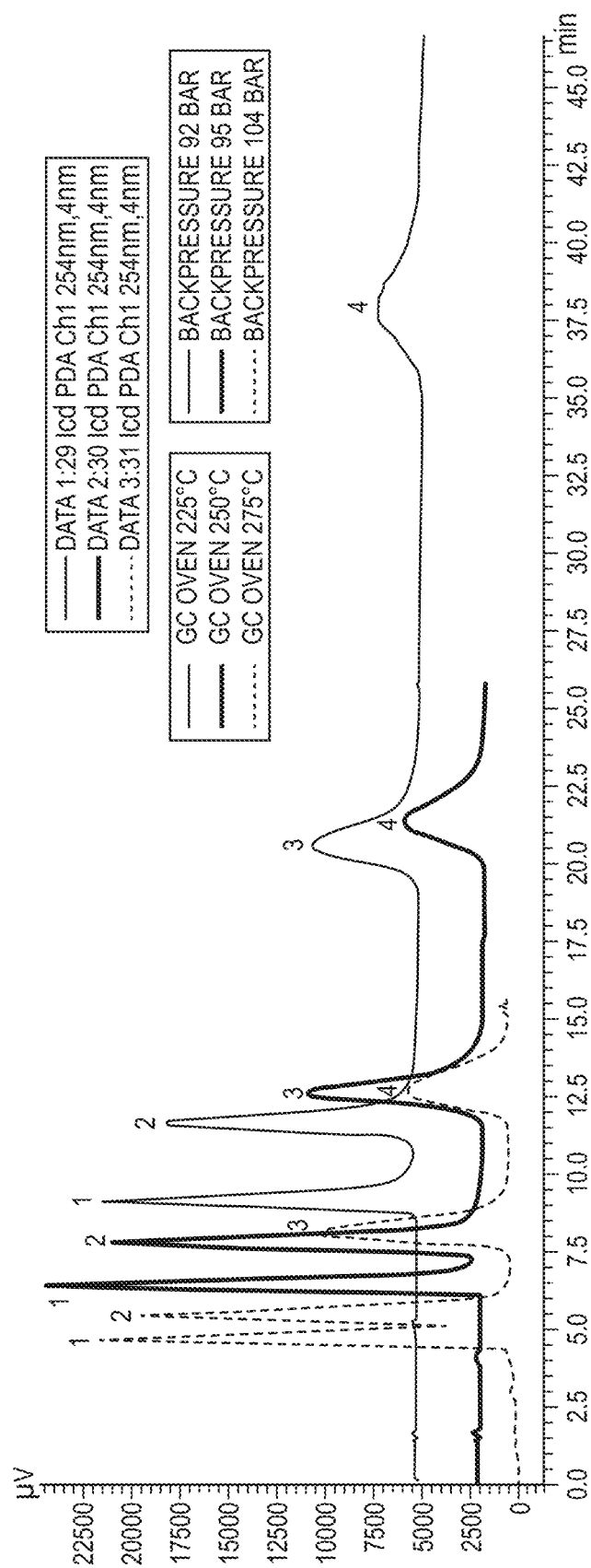
FIG. 4 shows the temperature stability of the PGC described herein by showing paraben separation at three temperatures; the paraben components are (1) methylparaben, (2) ethylparaben, (3) propylparaben, (4) butylparaben.

The results are shown in the chromatogram overlay in FIG. 4. No column bleed was observed. The PGC was stable at each temperature, though some decrease in lifetime was observed after prolonged use at 275° C.

Example 2. pH Stability pH stability was tested using the following procedure. A m/o-toluic acid sample was run on PGC column, 5 cm×3.0 mm I.D., 2.7 μm. Then, 400 column volumes of pH 1 solution were passed through the column. The column stability was retested with m/o-toluic acid sample. Then, 400 column volumes of pH 14 solution were passed through column. The column stability was retested with m/o-toluic acid sample.

The chromatographic conditions are summarized in the table below:

| | |
|---|---|
| column: | Inventive PGC; 5 cm × 3.0 mm I.D., 2.7 μm |
| mobile phase: | [A] 20 mM Ammonium Hydrogen Carbonate, pH 9.0 with Ammonium Hydroxide; [B] |
| gradient: | Hold at 0% B for 1 min; 0% B to 100% B in 10 min; Hold at 100% B for 1 min |
| flow rate: | 0.6 mL/min |
| column temp.: | 50° C. |

-continued

| | |
|---|---|
| detector: | UV, 254 nm |
| sampling rate: | 20 Hz |
| injection: | 5.0 μL |
| sample: | m/o-Toluic acid, 100 μg/mL, water |

Figure 5:
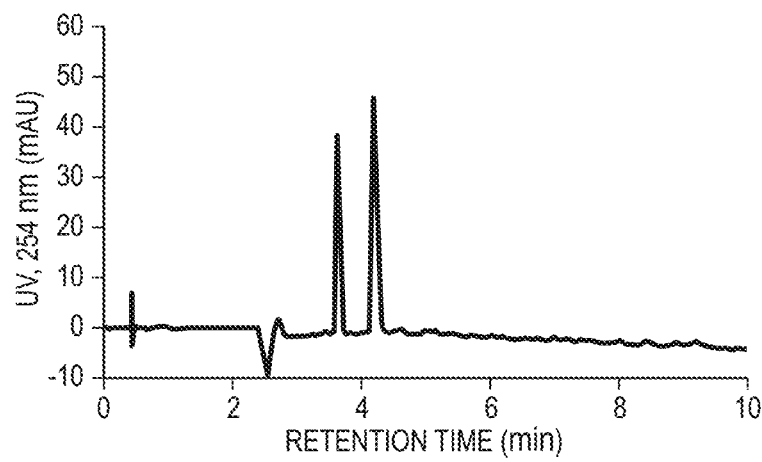
FIG. 5 shows chromatograms for a mixture of o- and m-toluic acid from the pH study detailed below; 5A shows the initial run, 5B was run after running 400 column volumes of pH 1 solution through the column, and 5C is after running 400 column volumes of pH 14 solution through the column.
Figure 5:
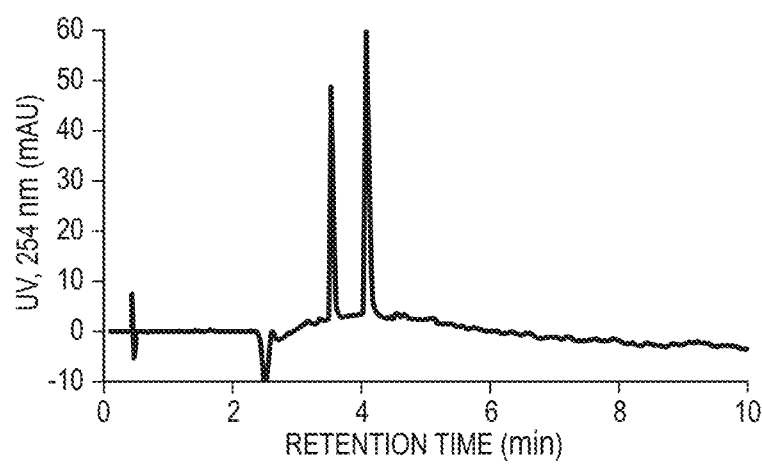
Figure 5:
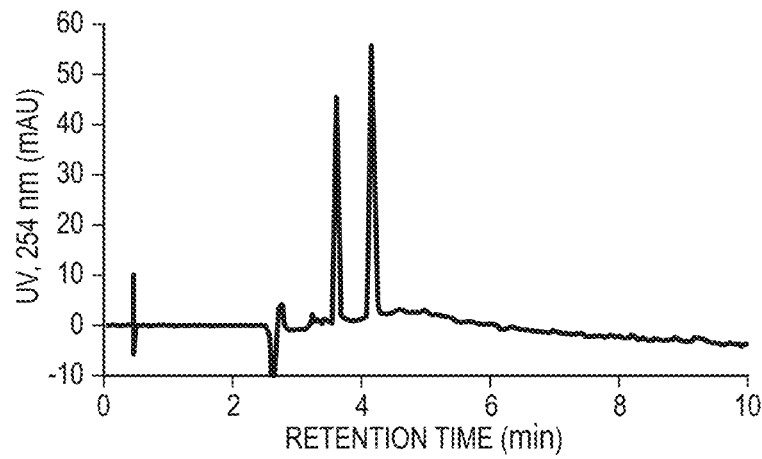

The chromatograms in FIG. 5 compare the initial run (5A), after running 400 column volumes of pH 1 solution through the column (5B), and after running 400 column volumes of pH 14 solution through the column (5C). No change in column stability due to repeated exposure to low and high pH was observed.

Example 3. Pressure Stability

Pressure stability of the inventive PGC was compared against a commercially available conventional PGC column. A sample containing a mixture of nitroalkanes, including (1) nitroethane, (2) 1-nitrobutane, (3) 1-nitropentane, and (4) 1-nitrohexane, was prepared.

The procedure was as follows. The column was installed onto HPLC instrument. Using 100% water as mobile phase, flow rates of both columns that would yield a pressure drop of ~11,000 psi was determined (1.75 mL/min for Supelco PGC; 2.00 mL/min for commercially available conventional PGC column). Experiment was done at 25° C. Flow rate was changed instantly from 0.0 mL/min to the desired flow rate determined above. Column was exposed to ~11,000 psi until pressure stabilized (around 10-15 s for each column), then flow rate was returned to 0.0 mL/min. Process was repeated 10 times.

It is noted that the first trial with the commercially available column only went to 5000 psi, then testing occurred, and then pressure ramps to 11,000 psi occurred. The inventive PGC saw two "trials" of ramps to 11,000 psi. Instrument backpressure was determined prior to testing to ensure column saw ~11,000 psi by compensating backpressure of injector to column.

The chromatographic conditions are summarized in the table below:

| | |
|---|---|
| columns: | Sample PGC-05G & Conventional PGC |
| geometry: | 50 × 3.0 mm |
| mobile phase: | (Isocratic) 80% Acetonitrile/20% Water |
| flow rate: | 0.6 mL/min |
| column temp.: | 25° C. |
| detector: | UV, 210 nm |
| injection: | 1.0 μL |
| sample: | Nitroalkane Mix: nitroethane, 1-nitrobutane, 1-nitropentane, 1-nitrohexane |

Figure 6:
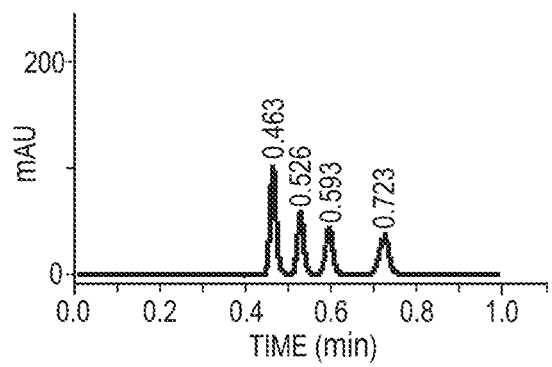
FIG. 6 shows chromatograms comparing separation of nitroalkanes comparing the column described herein (6A) with a commercially available column (6B), then the same columns after a first pressure shock test (6C) and (6D), respectively; then after a second shock test, (6E) and (6F), respectively.
Figure 6:
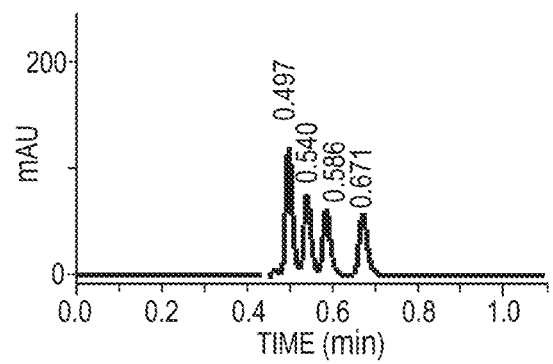
Figure 6:
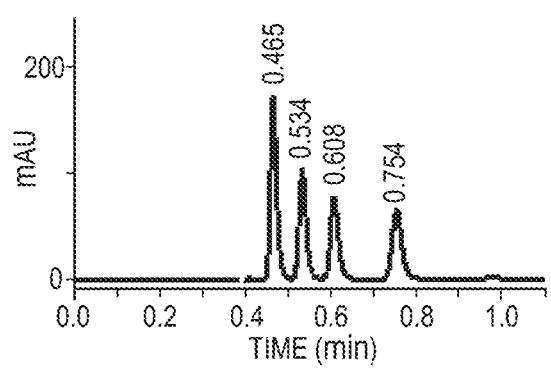
Figure 6:
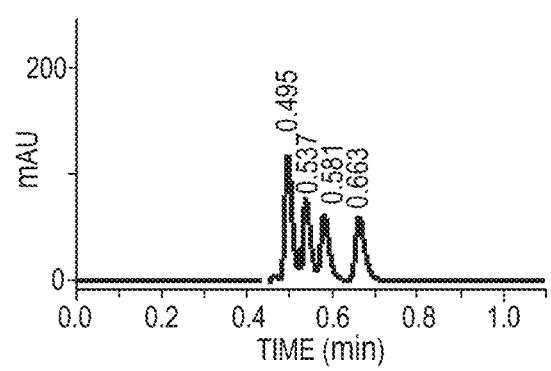
Figure 6:
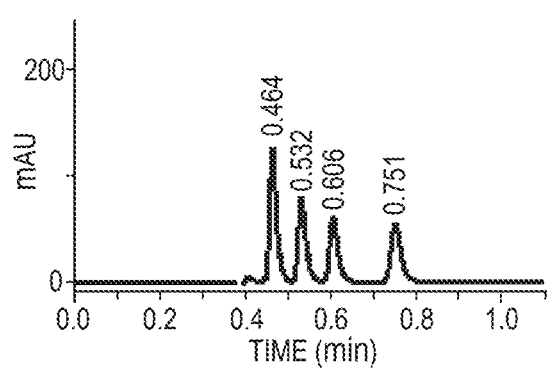
Figure 6:
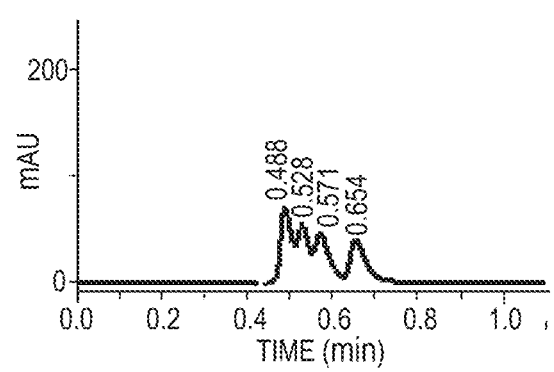

Chromatograms comparing performance are shown in FIG. 6 and the results are summarized in the table below.

| Column | | Initial Performance | First 11,000 PSI Pressure Shock | Second 11,000 PSI Pressure Shock |
|---|---|---|---|---|
| Efficiency | Sample PGC-05G (FIG. 6A) | 5391 | 5628 | 5282 |
| | Conventional PGC (FIG. 6B) | 5650 | 4882 | 1685 |
| USPtail | Sample PGC-05G (FIG. 6C) | 1.02 | 1.14 | 1.25 |
| | Conventional PGC (FIG. 6D) | 1.36 | 1.45 | 1.78 |
| Test Pressure | Sample PGC-05G (FIG. 6E) | 2746 psi | 2782 psi | 2810 psi |
| | Conventional PGC (FIG. 6F) | 1138 psi | 1172 psi | 1478 psi |

As shown in FIG. 6 and summarized above, the inventive PGC continues to perform well after two high-pressure shocks. The pressure increases and the performance quickly degrades with the conventional commercial carbon column.

Example 4. Nucleosides

A combination of nucleosides were analyzed under the following conditions.

| Nucleoside | Peak No. Conventional PGC FIG. 7A | Peak No. Inventive PGC-94G FIG. 7B |
|---|---|---|
| Uridine | 1 | 2 |
| 3-Methylcytidine | 2 | 1 |
| 1-Methyl adenosine | 3 | 3 |
| 7-Methylguanosine | 4 | 4 |
| 1-Methyladenosine Contaminant | 5 | 5 |

| HPLC Method | | Gradient Table | | | |
|---|---|---|---|---|---|
| | | Time | %A | %B | mL/min |
| Column | 10 × 2.1 Carbon | 00.0 | 90 | 10 | 0.25 |
| Injection | 10 μL | 40.0 | 40 | 60 | 0.25 |
| Flow Rate | 0.25 mL/min | 40.1 | 90 | 10 | 0.25 |
| Temp | 55° C. | 50.0 | 90 | 10 | 0.25 |
| Detection | UV 260,4; 360, 100 | | | | |
| MP A | 5 mM Ammonium Formate, pH 5.3 | | | | |
| MP B | Acetonitrile | | | | |

Figure 7:
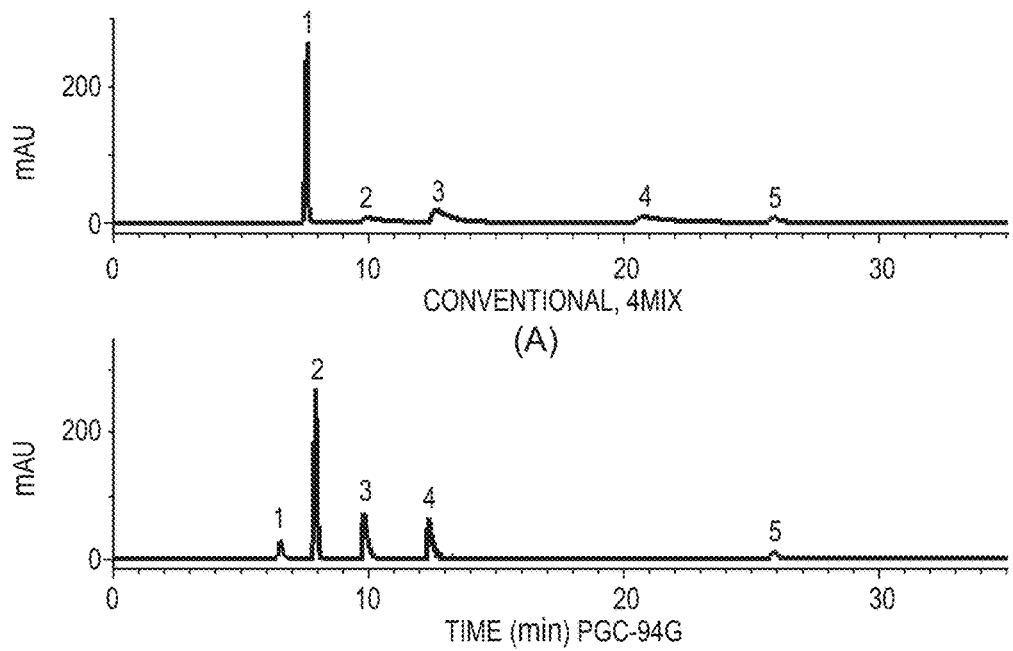
FIG. 7 shows chromatograms for the separation of a mixture of nucleosides comparing a commercial column (7A) and a column described herein (7B).

FIG. 7 shows the results for the commercially available conventional PGC column (7A) and the inventive PGC-94G column (7B).

Example 5. Nucleosides

Figure 8:
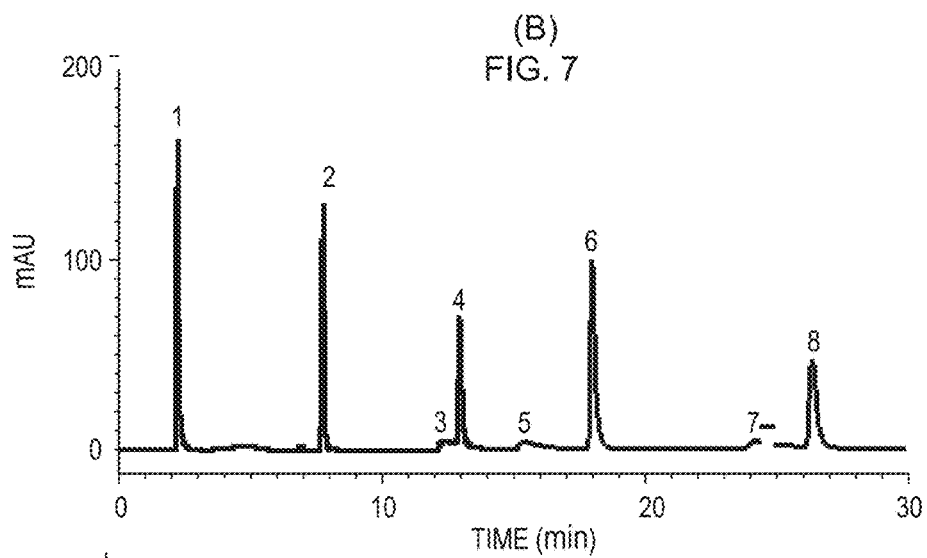
FIG. 8 shows chromatograms for the separation of a second mixture of nucleosides comparing a commercial column (8A) and a column described herein (8B).
Figure 8:
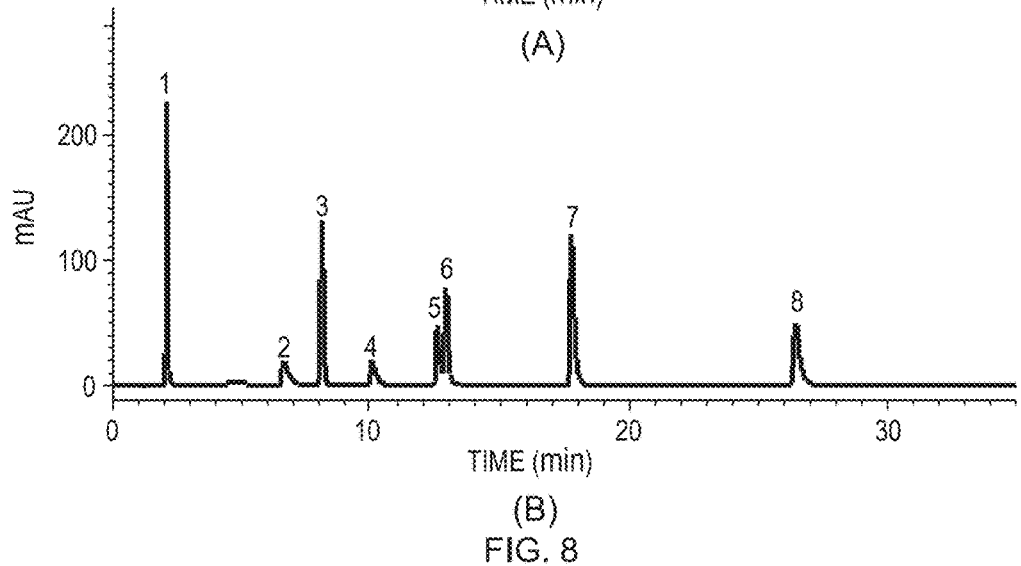

A second set of nucleosides, shown in the table below was analyzed under the same conditions. Chromatograms comparing a commercial PGC column and a column with the PGC described herein is shown in FIG. 8.

| Nucleoside | Peak No. Conventional FIG. 8A | Peak No. Inventive PGC FIG. 8B |
|---|---|---|
| Cytosine | 1 | 1 |
| Uridine | 2 | 3 |
| 3-Methylcytidine | 3 | 2 |
| Inosine | 4 | 6 |
| 1-Methyladensosine | 5 | 4 |
| Adenosine | 6 | 7 |
| 7-Methylguanosine | 7 | 5 |
| 8. 1-Methyladenosine Contaminant | 8 | 8 |

Example 6. Ephedrines

Figure 9:
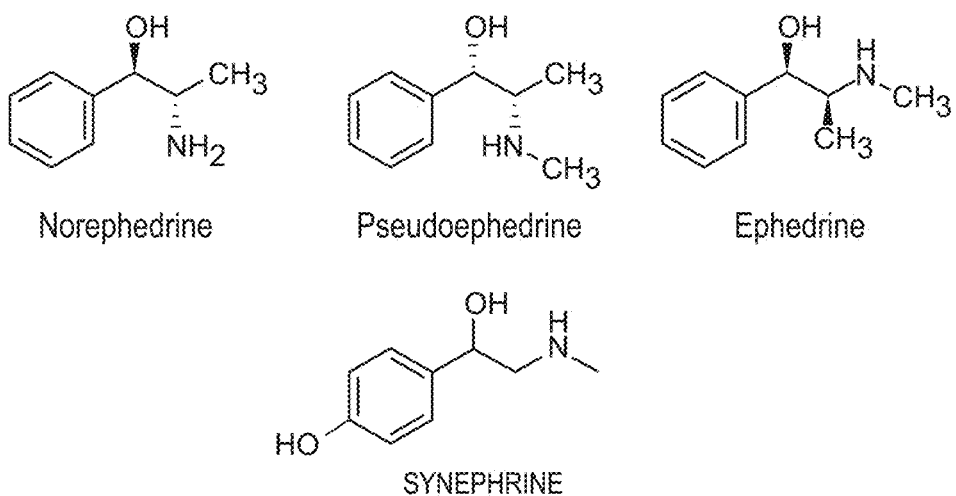
FIG. 9 show the structures of ephedrine and related compounds.

A mixture of ephedrine, norephedrine, pseudoephedrine and synephrine, see FIG. 9, were analyzed using the commercial conventional PGC and inventive PGC column under the conditions below.

| | |
|---|---|
| column: | As indicated, 10 cm × 2.1 mm I.D., 2.7 μm |
| mobile phase: | [A] Water (0.1% DFA); [B] Acetonitrile (0.1% DFA) |
| gradient: | Hold at 5% B for 1 min; 5% B to 15% B in 5 min |
| flow rate: | 0.5 mL/min |
| column temp.: | 50 ° C. |
| detector: | UV, 254 nm |
| injection: | 5.0 μL |
| sample: | Ephedrine and related compounds, 200 p.g/mL, water |

Figure 10:
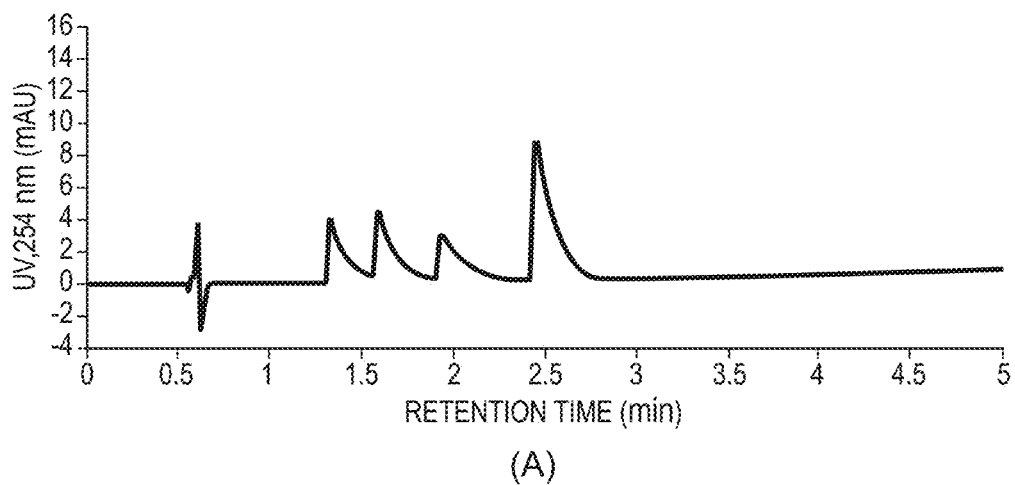
FIG. 10 shows chromatograms comparing the separation of ephedrine and related compounds using the commercial PGC (10A) and the inventive PGC column (10B).
Figure 10:
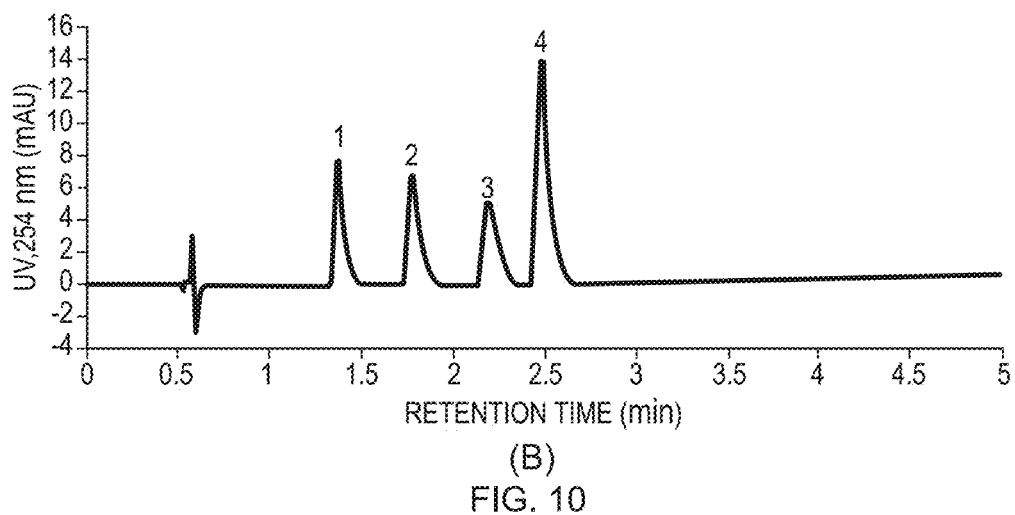

The results are shown in the chromatograms in FIG. 10 and summarized in the tables below.

| Inventive PGC | | | | |
|---|---|---|---|---|
| Analyte | Peak Width, Half Height | Tailing | Resolution | Plates/Meter |
| Norephedrine | 0.087 | 1.810 | n/a | 144485 |
| Pseudoephedrine | 0.120 | 1.779 | 4.18 | 129827 |
| Ephedrine | 0.153 | 1.898 | 3.02 | 119597 |
| Synephrine | 0.127 | 1.758 | 1.95 | 218297 |

| Conventional PGC | | | | |
|---|---|---|---|---|
| Analyte | Peak Width, Half Height | Tailing | Resolution | Plates/Meter |
| Norephedrine | 0.148 | 3.920 | n/a | 45076 |
| Pseudoephedrine | 0.142 | 4.209 | 1.85 | 70599 |
| Ephedrine | 0.166 | 3.217 | 2.26 | 76683 |
| Synephrine | 0.177 | 3.897 | 2.97 | 107237 |

Example 7. Ephedrines Comparison with Current HILIC Methodology

The same ephedrine mixture sample from Example 6 was run using current HILIC methodology using the parameters in the table below.

| | |
|---|---|
| column: | Ascentis Express HILIC, 10 cm × 2.1 mm I.D., 2.7 μm particles (53939-U) |

| | |
|---|---|
| column temp.: | 35 ° C. |
| mobile phase: | [A] acetonitrile; [B] 40 mM ammonium acetate in water; (90:10, A:B) |
| flow rate: | 0.4 mL/min |
| sample: | 150 μg/mL each in mobile phase |
| injection: | 1 μL |
| detector: | UV, 254 nm |

Figure 11:
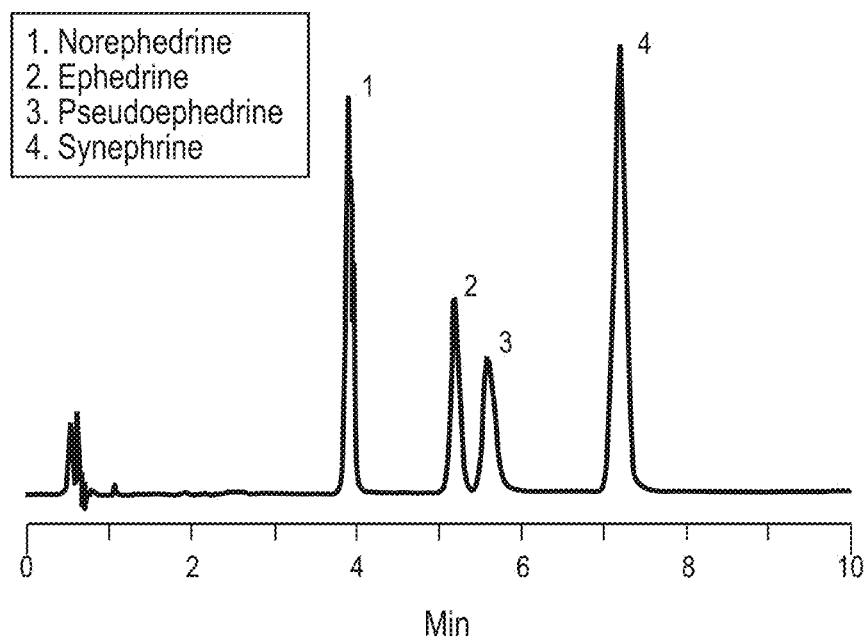
FIG. 11 shows a chromatogram for the ephedrine and related compounds sample run using current HILIC methodology.

The resulting chromatogram is shown in FIG. 11. When compared with the chromatogram from Example 6 (FIG. 10B) is shown that the columns packed with the PGC described herein show orthogonal selectivity.

Example 8. Paraquat and Diquat

Figure 12:
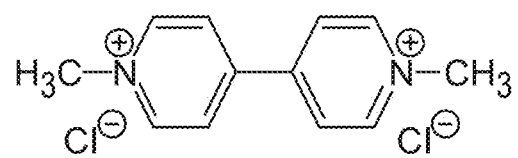
FIG. 12 shows the structures of dipryridylium herbicides, paraquat (12A) and diquat (12B).
Figure 12:
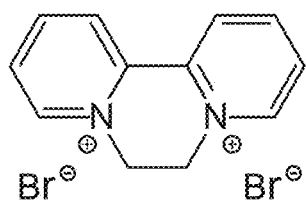

A mixture of the dipryridylium herbicides, paraquat and diquat (structures shown in FIG. 12) was run on the conventional commercial PGC column and a column packed with the PGC described herein using the following conditions:

| | |
|---|---|
| column: | As indicated, 10 cm × 2.1 mm I.D., 2.7?+0m |
| mobile phase: | [A] Water (0.1% DFA); [B] Acetonitrile (0.1% DFA) |
| gradient: | Hold at 0% B for 1 min; 0% B to 15% B in 10 min |
| flow rate: | 0.5 mL/min |
| column temp.: | 35° C. |
| detector: | UV, 257 nm (paraquat), 308 nm (diquat) |
| injection: | 2.0 μL |
| sample: | Paraquat and diquat, 100 μg/mL, water |

Figure 13:
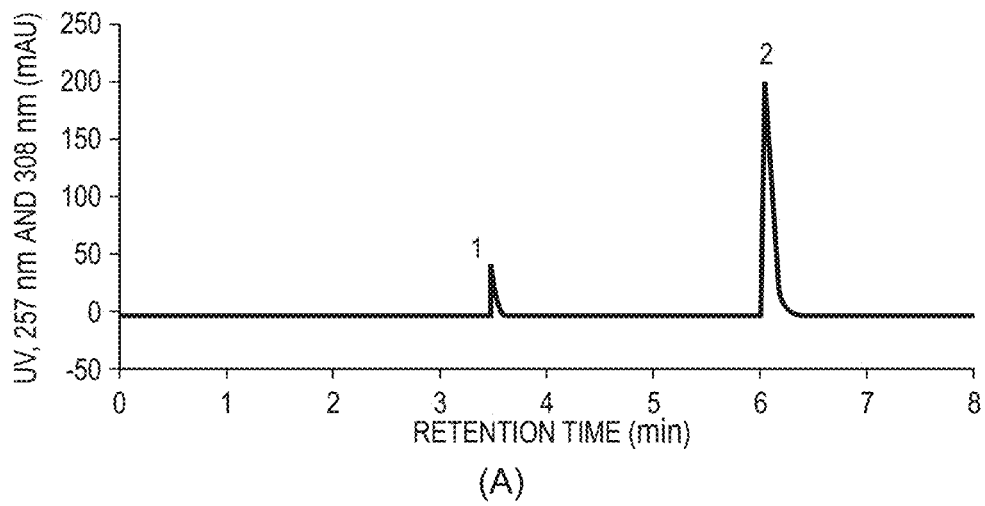
FIG. 13 shows chromatograms of a mixture of paraquat and diquat run on the PGC described herein (13A) and a column using the commercial PGC column (13B).
Figure 13:
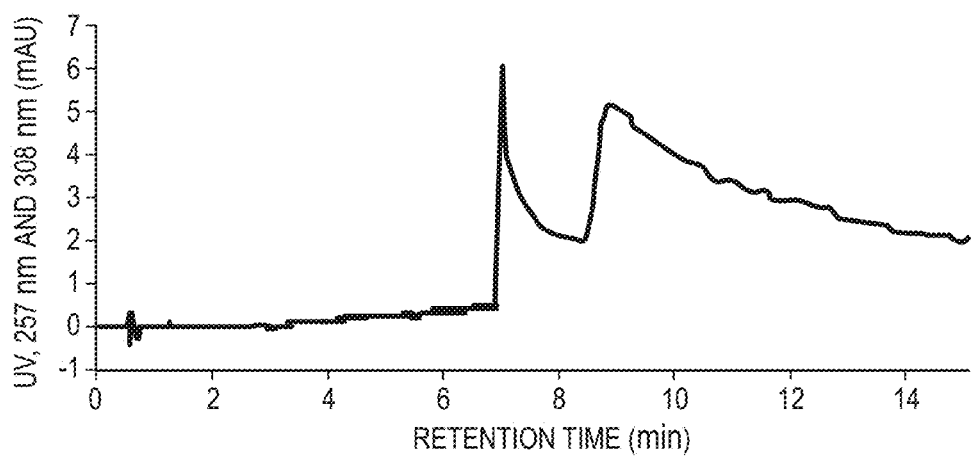

The chromatograms are shown in FIG. 13; 13A was run on the column packed with the PGC described herein, while 13B was run on the conventional commercial PGC column under the same conditions.

Example 9. Paraquat and Diquat Comparative Example

For comparison, the mixture of paraquat and diquat was run using current HILIC methodology using the parameters in the table below.

| | |
|---|---|
| column | Ascentis Express HILIC, 10 cm × 2.1 mm I.D., 2.7 μm particles (53939-U) |
| column temp. | 60° C. |
| mobile phase | [A] 200 mM ammonium TFA; [B] acetonitrile; (20:80, A:B) |
| flow rate | 0.4 mL/min |
| sample | 50 mg/L in mobile phase |
| injection | 1 μL |
| detector | UV, 257 nm (paraquat) and 308 nm (diquat) |

Figure 14:
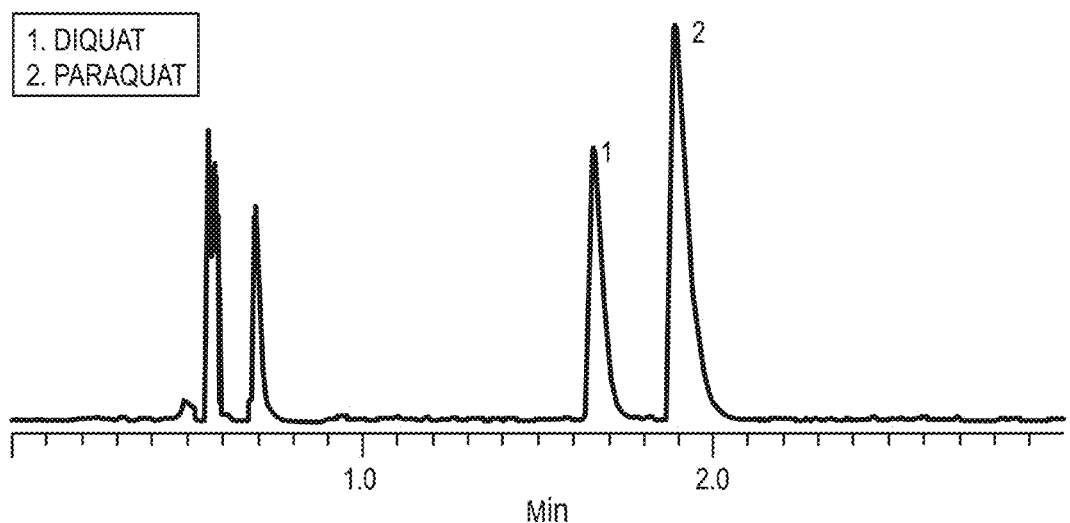
FIG. 14 shows a chromatogram for the separation of the mixture of paraquat and diquat run using current HILIC methodology.

FIG. 14 shows the chromatogram for this separation using current HILIC methodology.

Example 10. Polar Pesticides

Polar pesticide standards, shown below,

| Analyte | m/z |
|---|---|
| Glyphosate | 170 |
| Aminomethylphosphonic acid (AMPA) | 112 |
| Ethephon | 145 |
| Hydroxyethylphosphonic acid (HEPA) | 127 |
| Glufosinate | 182 |
| N-Acetylglufosinate | 224 |
| Methylphosphonic acid (MPPA) | 153 |
| Fosetyl-aluminum | 111 |
| Phosphonic acid | 83 |
| Maleic hydrazide | 113 |
| Perchlorate | 101 |
| Chlorate | 85 |
| Cyanuric acid | 130 |
| Bialaphos | 324 | were analyzed using the PGC described herein and the conventional commercial PGC column using the conditions shown below.

| | |
|---|---|
| column: | As indicated; 5 cm × 3.0 mm I.D., ~3 μm |
| mobile phase: | [A] Water (0.1% DFA); [B] Acetonitrile (0.1% DFA) |
| gradient: | Hold at 0% B for 0.5 min; 0% B to 100% B in 10 min |
| flow rate: | 0.3 mL/min |
| column temp.: | 60° C. |
| detector: | MSD, ESI-(+) |
| injection | 5.0 μL |
| sample: | Pesticide standards, 50 μg/mL, water |

Figure 15:
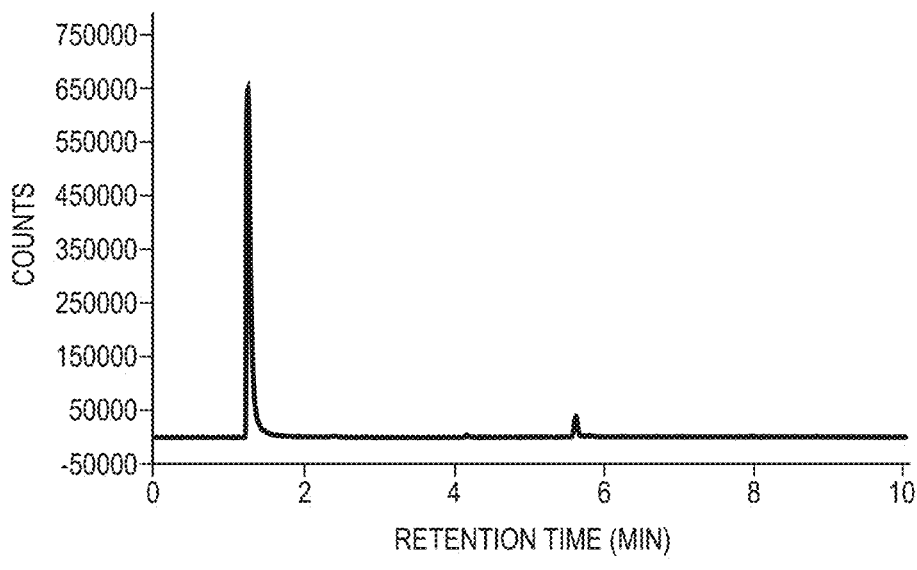
FIG. 15 shows chromatographs of glyphosate standards taken using the PGC described herein (15A) and a commercial PGC column (15B).
Figure 15:
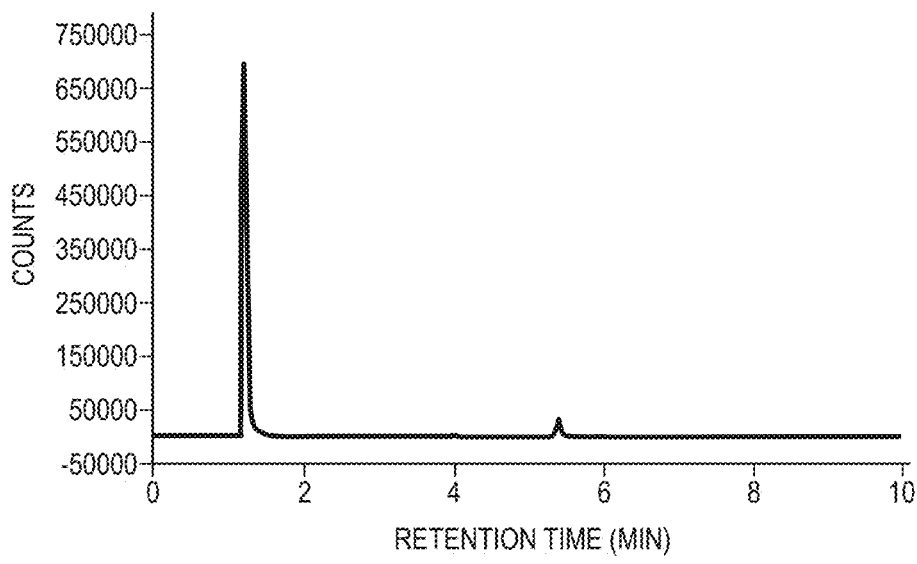
Figure 16:
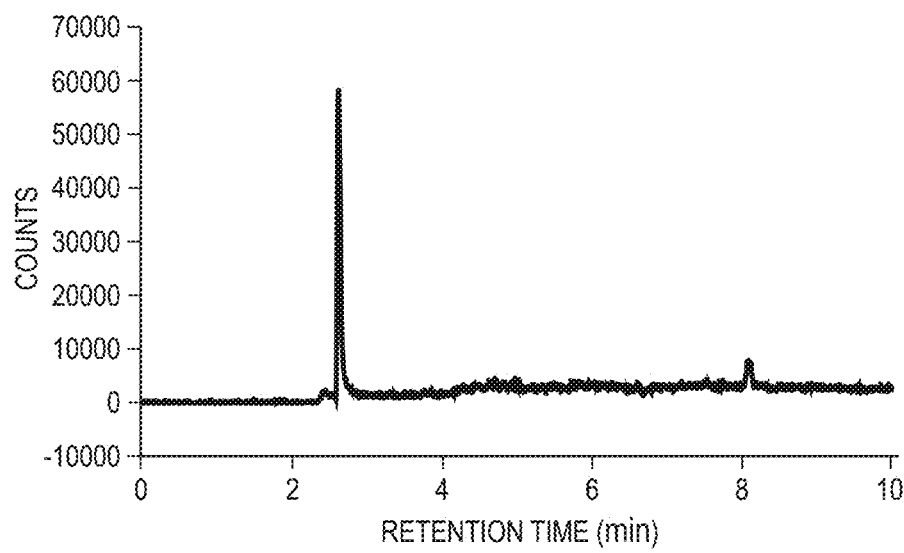
FIG. 16 shows chromatographs of maleic hydrazide standards taken using the PGC described herein (16A) and a commercial PGC column (16B).
Figure 16:
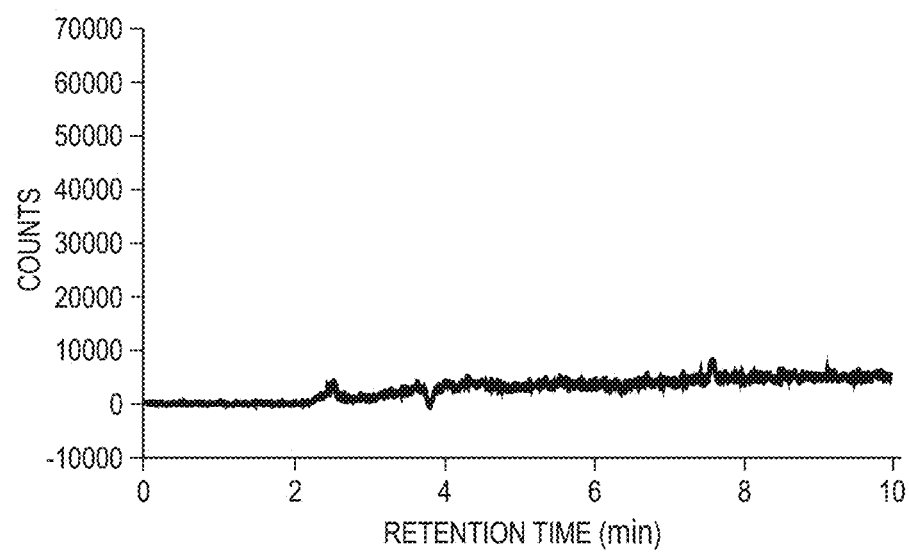
Figure 17:
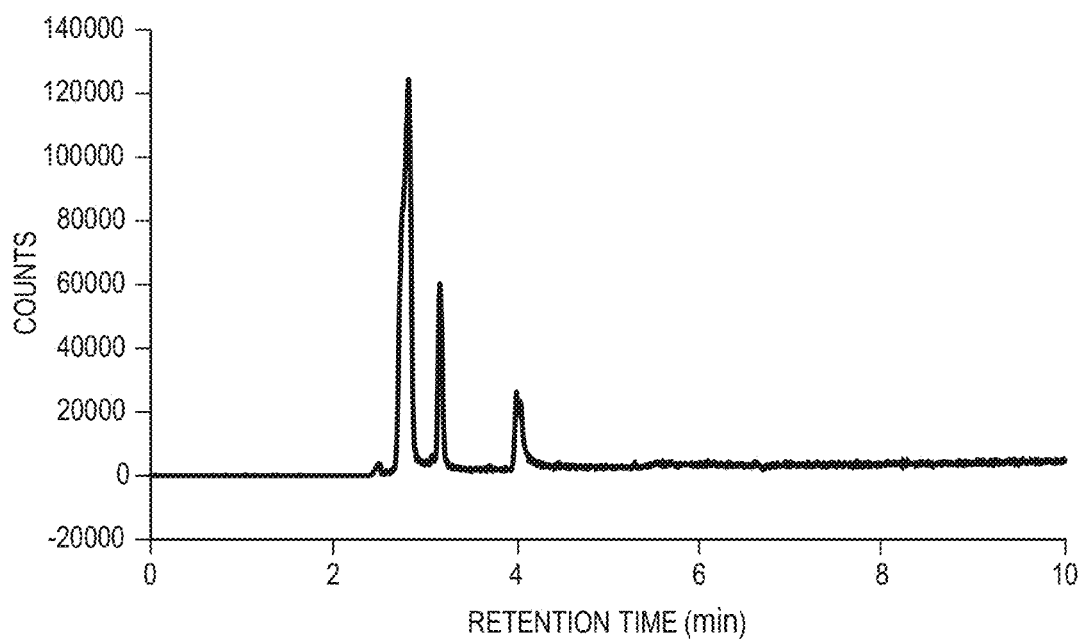
FIG. 17 shows chromatographs of cyanuric acid standards taken using the PGC described herein (17A) and a commercial PGC column (17B).
Figure 17:
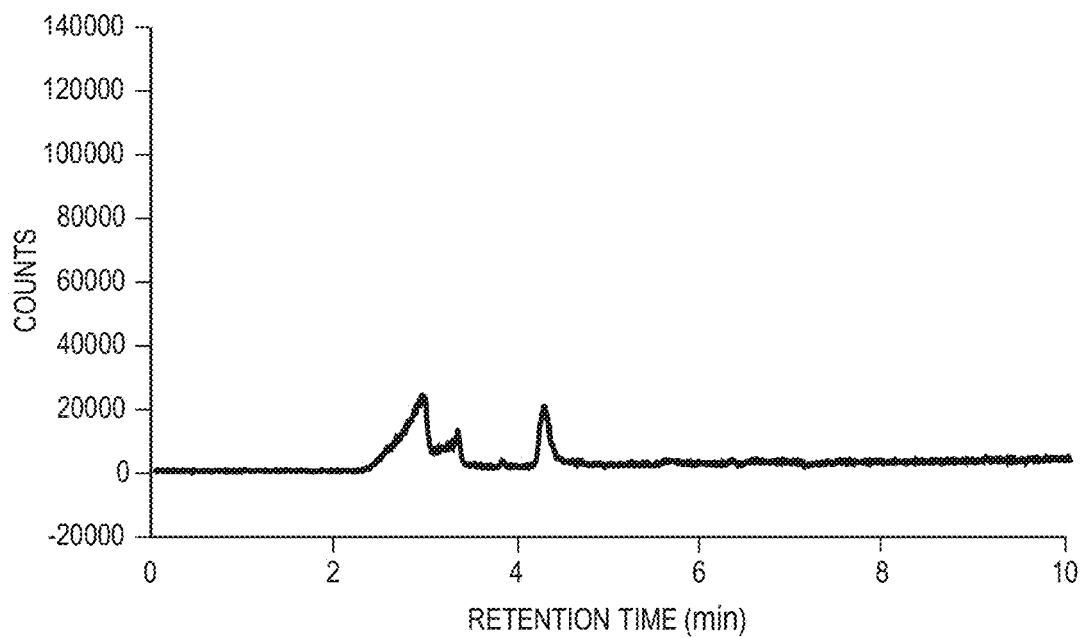

Results comparing the PGC columns described herein, denoted as (A) in each figure, with the commercially available PGC column, denoted as (B) in each figure, are shown for glyphosate (FIG. 15), maleic hydrazide (FIG. 16) and cyanuric acid (FIG. 17).

Example 11. Amino Acids

A mixture of twenty amino acids was analyzed using the PGC column described herein and the conventional commercially available PGC column. The amino acids in the mixture are:

| | |
|---|---|
| 1 | Glycinle (GLY) |
| 2 | Serine (SER) |
| 3 | Alanine (ALA) |
| 4 | Threonine (THR) |
| 5 | Asparagine (ASN) |
| 6 | Cysteine (CYS) |
| 7 | Aspartic Acid (ASP) |
| 8 | Proline (PRO) |
| 9 | Glutamine (GLN) |
| 10 | Glutamic Acid (GLU) |
| 11 | Valine (VAL) |
| 12 | Lysine (LYS) |
| 13 | Leucine (LEU) |
| 14 | Methionine (MET) |
| 15 | Isoleucine (ILE) |
| 16 | Histidine (HIS) |
| 17 | Arginine (ARG) |
| 18 | Phenylalanine (PHE) |
| 19 | Tyrosine (TYR) |
| 20 | Tryptophan (TRP) |

The following conditions were used:

| | |
|---|---|
| columns: | Inventive PGC-1021-05 & Conventional PGC |
| geometry: | 100 × 2.1 mm |
| mobile phase: | (A) 20 mM nonafluoropentanoic acid (NFPA) (aq.)/(B) Acetonitrile −30 min. gradient |
| flow rate: | 0.20 mL/min |

-continued

| | |
|---|---|
| column temp.: | 12° C. |
| detector: | EISD 55, 55, 155 |
| injection: | 2.0 µL |
| sample: | Custom R&D Amino Acid Final Mix (table above) |

Figure 18:
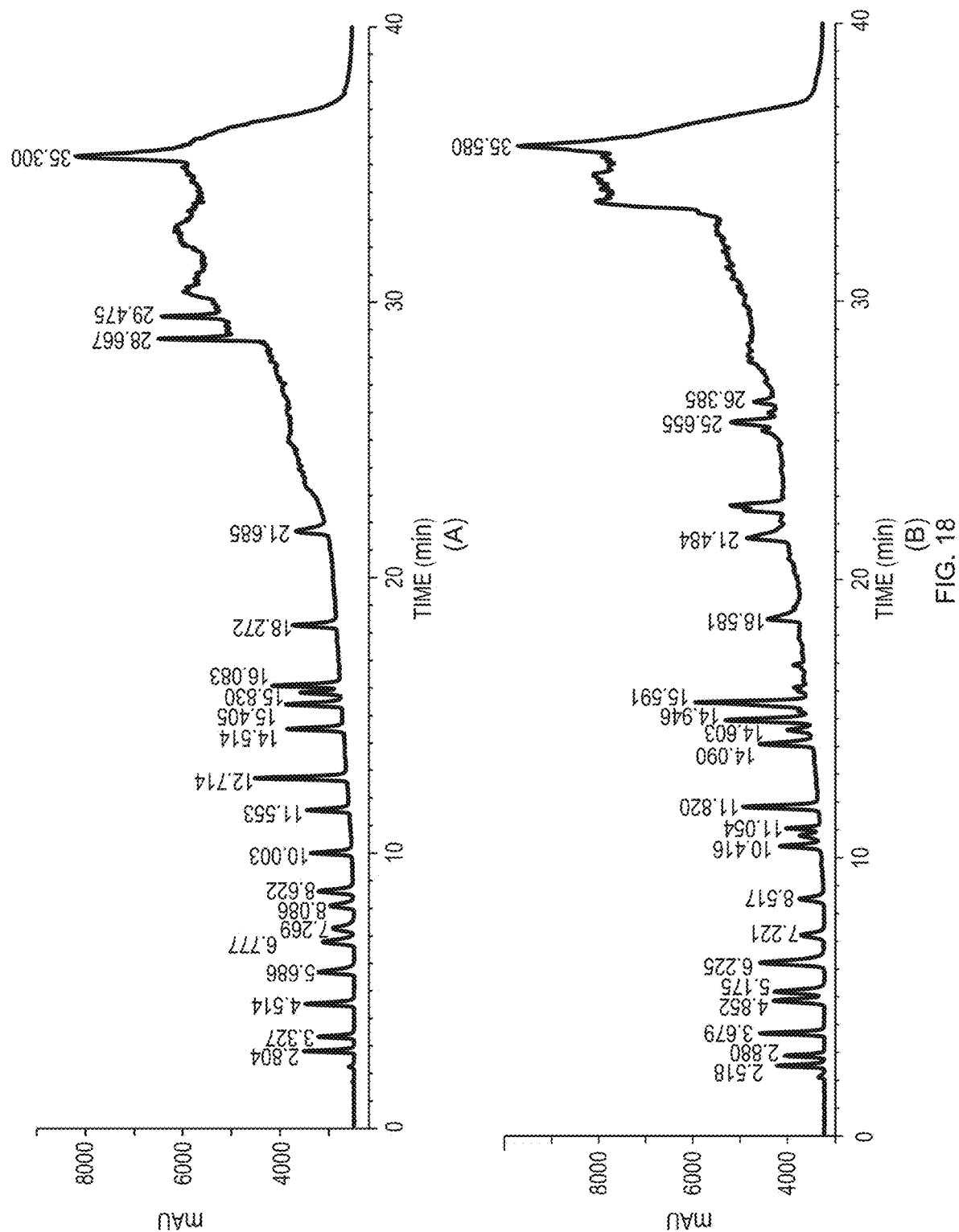
FIG. 18 shows chromatographs of an amino acid mixture taken using the PGC described herein (18A) and a commercial PGC column (18B).
Figure 19:
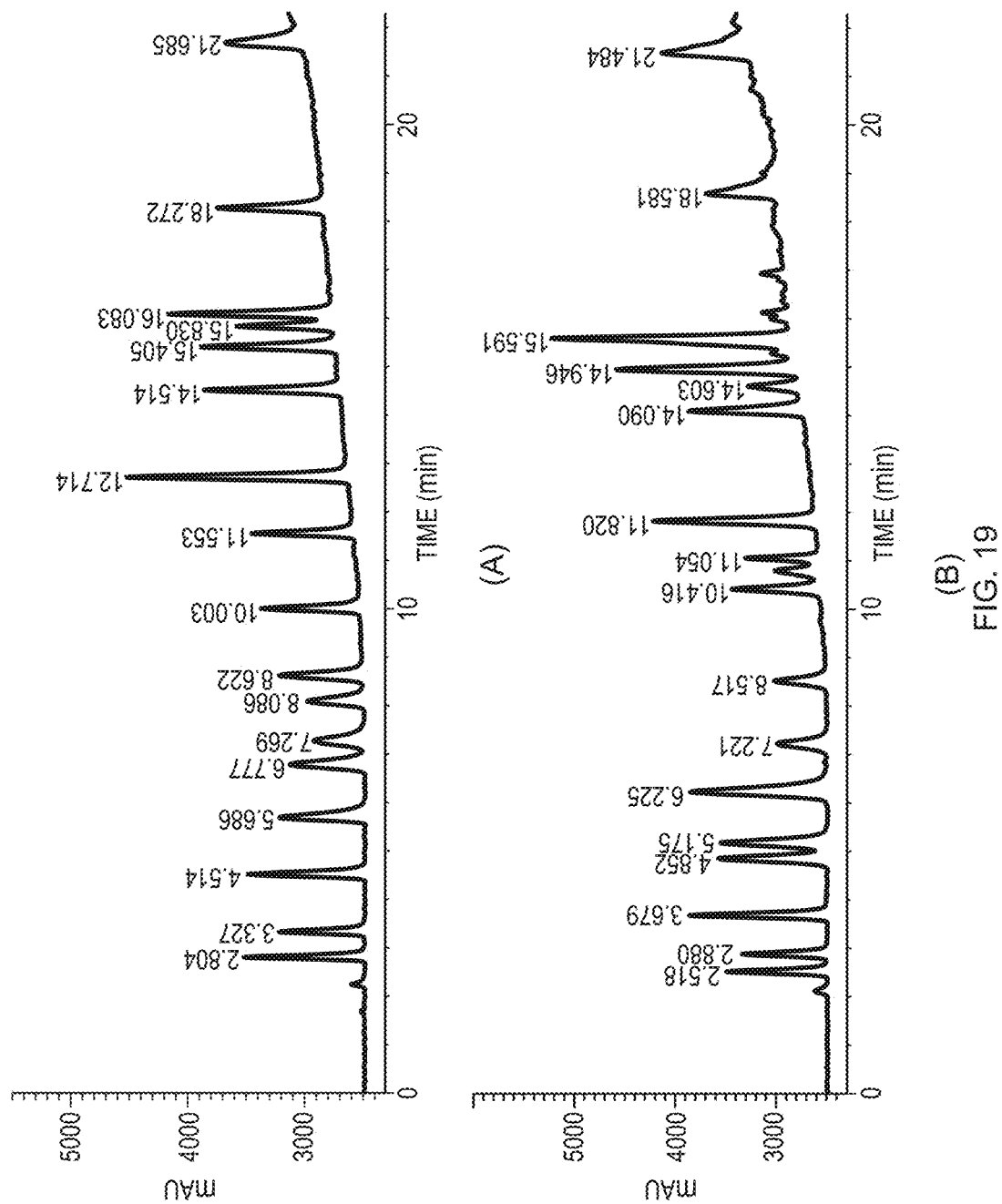
FIG. 19 shows the first 22 minutes retention time of the chromatographs from FIG. 18 to show more detail comparing the PGC described herein (19A) and a commercial PGC column (19B).

The resulting chromatograms are shown in FIGS. 18 and 19, with the inventive PGC column in 18A and 19A, and the commercially available conventional PGC column in 18B and 19B. The elution order of the amino acids for the PGC column described herein is noted in the table of amino acids above. For the commercially available conventional PGC column, the only difference in the elution order is that cysteine and asparagine switched places, eluting seventh and sixth, respectively.

Example 12. Phosphopeptides

A phosphopeptide mixture with the following analytes was evaluated using the PGC described herein and the commercial commercially available conventional PGC column.

| Peptide Sequence* | m/z** |
|---|---|
| VLHSGpSR | 418.1953 |
| RDSLGpTYSSR | 611.2672 |
| pTKLIpTQLRDAK | 482.9093 |
| ADEPpSSEESDLEIDK | 872.3464 |
| ADEPSpSEEpSDLEIDK | 608.5557 |
| FEDEGAGFEESpSETGDYEEK | 778.9536 |

*Lower-case "p" in front of capital letter indicates phosphorylated amino acid (i.e. pS = phosphoserine).
**Indicates m/z of most abundant ion.

The following chromatographic conditions were used.

| | |
|---|---|
| column: | As indicated; 5 cm × 3.0 mm I.D., ~3 µm |
| mobile phase: | [A] Water (0.1% DFA); [B] Acetonitrile (0.1% DFA) |
| gradient: | 0% B to 100% B in 30 min |
| flow rate: | 0.3 mL/min |
| column temp.: | 60 ° C. |
| detector: | MSD, ESI-(+), 50 –3000 m/z |
| injection | 5.0 µL |
| sample: | Phosphopeptide mix, 1000 pmol/mL, 80:20 water:acetonitrile (0.1% DFA) |

Figure 20:
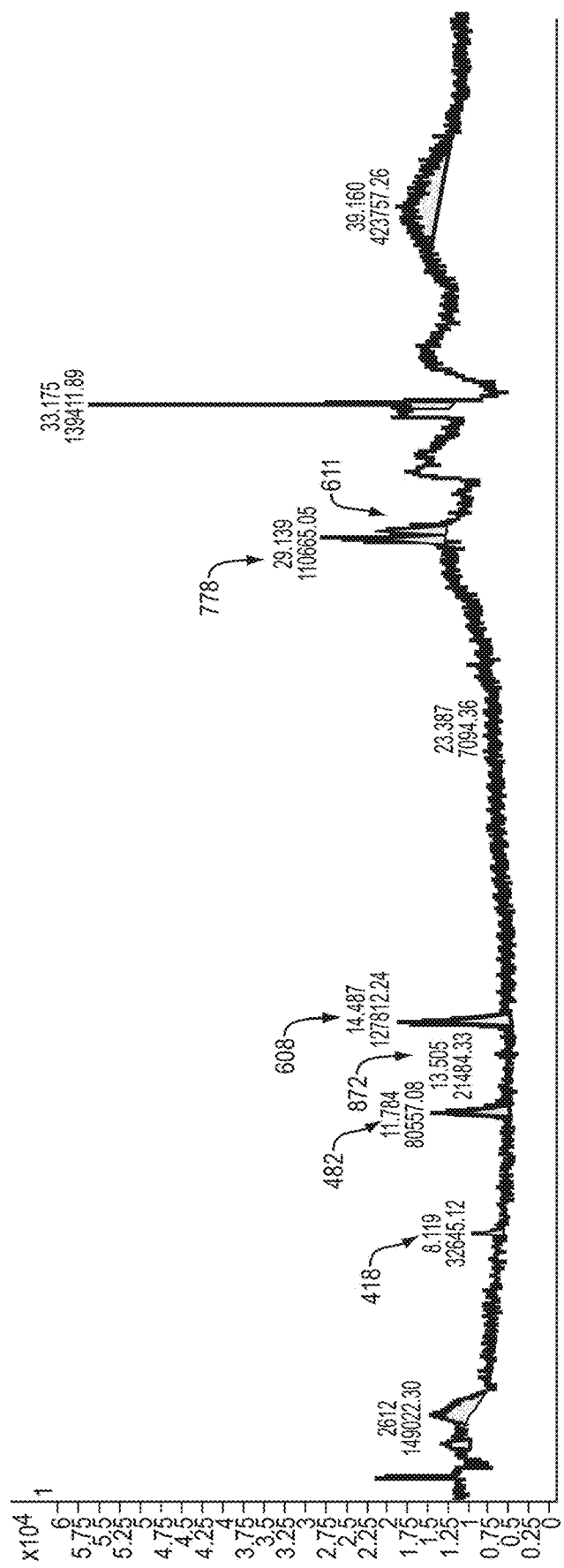
FIG. 20 shows the chromatograms obtained using PGC described herein (20A) compared with the commercial PGC column (20B).
Figure 20:
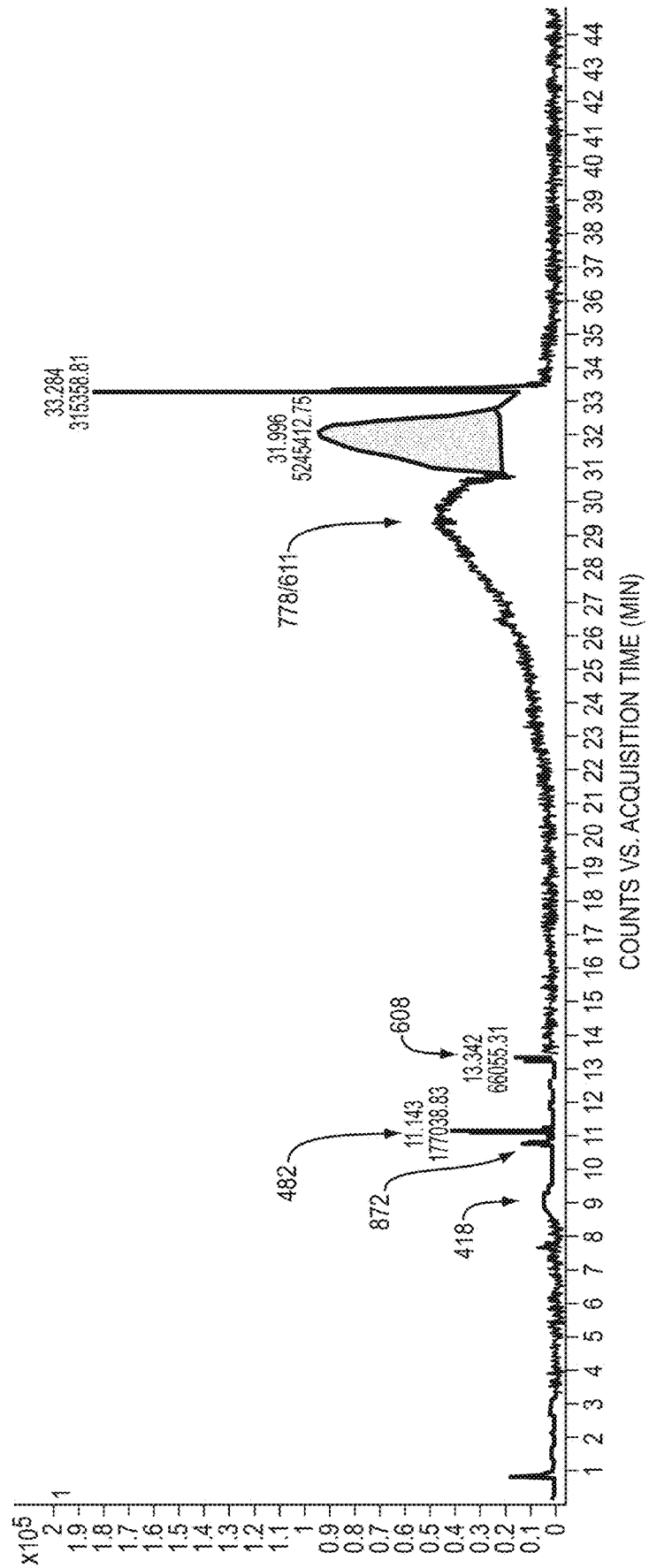

FIG. 20 shows the chromatograms obtained using PGC prepared using the methods described herein (PGC-24) (20A) compared with the chromatogram obtained using the commercial commercially available conventional PGC column (20B).

Example 13. Vitamins D2 & D3

A mixture of vitamin D2 and D3 analytes, 3-epi-25-hydroxyvitamin D3, 25-hydroxyvitamin D3, 3-epi-25-hydroxyvitamin D2 and 25-hydroxyvitamin D2 was run using the PGC column described herein and the following conditions:

| | |
|---|---|
| column: | Inventive PGC-1021-05 |
| geometry: | 100 × 2.1 mm |
| mobile phase: | (gradient) A: 100% IPA; B: 100% THF |
| | 100% (A) → 30% (A); 0-15 mins. |
| | 5 min. hold; 15-20 mins. |
| | 30% (A) → 100% (A); 20-30 mins. |
| flow rate: | 0.3 mL/min |
| column temp.: | 25° C. |
| detector: | UV at 275 nm |
| injection: | 2.0 µL |
| sample: | Vitamin Mix |

Figure 21:
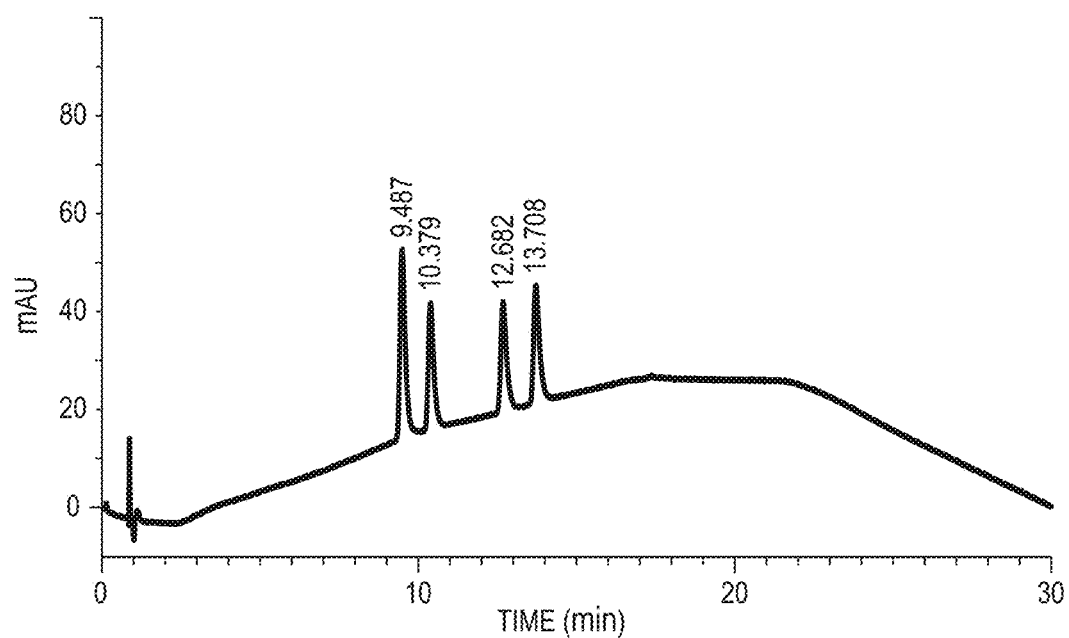
FIG. 21 shows a chromatogram of a mixture of vitamin D2 and D3 analytes run using a PGC column described herein.

The chromatogram is shown in FIG. 21, with the elution order of analytes (1) 3-epi-25-hydroxyvitamin D3, (2) 25-hydroxyvitamin D3, (3) 3-epi-25-hydroxyvitamin D2, and (4) 25-hydroxyvitamin D2.

The examples herein are for illustrative purposes and are not meant to limit the scope of the invention as defined by the claims.

We claim:

1. A method for making porous graphitic carbon microspheres comprising the steps of:
   providing porous silica microspheres,
   dispersing a monovinyl aromatic monomer, a polyvinyl aromatic monomer, and an initiator in a solvent,
   contacting the porous silica microspheres with the monomer dispersion for a time sufficient for the monomers to coat the porous silica microspheres,
   polymerizing the monomers to form copolymer coated microspheres,
   sulfonating the copolymer to form a sulfonated copolymer,
   pyrolyzing the sulfonated copolymer to form carbon microspheres,
   digesting the carbon microspheres to dissolve the silica leaving porous carbon microspheres,
   pyrolyzing the porous carbon microspheres, and
   graphitizing the porous carbon microspheres to form porous graphitic carbon microspheres.

2. The method of claim 1 wherein the porous graphitic carbon microspheres have a diameter in the range from 1 micron to 20 microns.

3. The method of claim 2 wherein the porous graphitic microspheres have a diameter in the range from 1 micron to 3 microns.

4. The method of claim 1 wherein the porous graphitic carbon microspheres have a pore volume in the range from 0.3 cm3/g to 1 cm3/g.

5. The method of claim 1 wherein the porous graphitic carbon microspheres have a pore diameter in the range from 20 Å to 250 Å.

6. The method of claim 5, wherein the porous graphitic carbon microspheres have a pore diameter in the range from 30 Å to 200 Å.

7. The method of 6, wherein the porous graphic carbon microspheres have a pore diameter of 200 Å.

8. The method of claim 1 wherein the monovinyl aromatic monomer is styrene and the polyvinyl aromatic monomer is divinylbenzene.

9. The method of claim 8 wherein the ratio of styrene:divinylbenzene is in the range from 10:90 to 50:50 (wt. %).

10. The method of claim 9 wherein the ratio of styrene:divinylbenzene is 30:70 (wt. %).

11. The method of claim 1 wherein the sulfonating step comprises
   adding a mixture of sulfuric acid and fuming sulfuric acid to the copolymer coated microspheres while stirring and then
   heating to 65° C. for a time sufficient to sulfonate the copolymer.

12. The method of claim 1 wherein the first pyrolysis step is carried out at 500° C.

13. The method of claim 1 wherein the digestion step is carried out in a base.

14. The method of claim 1 wherein the second pyrolysis step is carried out at 1050° C.

15. The method of claim 1 wherein the graphitization step is carried out at 2500° C.

16. A method for preparing porous graphitic carbon microspheres comprising:
   providing a porous microsphere hard template,
   contacting the hard template with a combination of comonomers comprising divinylbenzene and styrene so that the comonomers impregnate the pores of the hard template,
   polymerizing the comonomers form a divinylbenze-styrene copolymer,
   sulfonating the copolymer,
   pyrolyzing the sulfonated copolymer to form carbon microspheres,
   dissolving the hard template to form porous carbon microspheres,
   graphitizing the porous carbon microspheres.

17. The porous graphitic carbon microspheres formed by the method of claim 1.

18. A column for liquid chromatography comprising the porous graphitic carbon microspheres of claim 17.

19. The porous graphitic carbon microsphere formed by the method of claim 16.

20. A column for liquid chromatography comprising the porous graphitic carbon microspheres of claim 19.

* * * * *

UNITED STATES PATENT AND TRADEMARK OFFICE
CERTIFICATE OF CORRECTION

| | |
|---|---|
| PATENT NO. | : 11,806,693 B2 |
| APPLICATION NO. | : 17/349562 |
| DATED | : November 7, 2023 |
| INVENTOR(S) | : William R. Betz et al. |

It is certified that error appears in the above-identified patent and that said Letters Patent is hereby corrected as shown below:

In the Claims

In Column 17, Line 53, in Claim 7 delete "graphic" and insert -- graphitic --

Signed and Sealed this
Twelfth Day of December, 2023

*Katherine Kelly Vidal*

Katherine Kelly Vidal
*Director of the United States Patent and Trademark Office*